(12) United States Patent
Aida et al.

(10) Patent No.: US 7,758,248 B2
(45) Date of Patent: Jul. 20, 2010

(54) BEARING ASSEMBLY

(75) Inventors: Tomoyuki Aida, Toyota (JP); Hiroshi Yano, Nagoya (JP); Katsunori Tsumura, Aichi (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 492 days.

(21) Appl. No.: 11/663,842

(22) PCT Filed: Sep. 29, 2005

(86) PCT No.: PCT/JP2005/017977

§ 371 (c)(1),
(2), (4) Date: Mar. 27, 2007

(87) PCT Pub. No.: WO2006/038521

PCT Pub. Date: Apr. 13, 2006

(65) Prior Publication Data

US 2008/0031558 A1    Feb. 7, 2008

(30) Foreign Application Priority Data

Oct. 1, 2004   (JP) ............................. 2004-290181
Oct. 18, 2004  (JP) ............................. 2004-302708

(51) Int. Cl.
*F16C 33/78*    (2006.01)
(52) U.S. Cl. ...................... 384/477; 384/489
(58) Field of Classification Search ......... 384/446–448, 384/537, 544, 548
See application file for complete search history.

(56) References Cited

U.S. PATENT DOCUMENTS

| | | | | |
|---|---|---|---|---|
| 3,910,386 A | * | 10/1975 | Stigall et al. ............ | 188/181 R |
| 3,916,234 A | * | 10/1975 | Stigall et al. ............ | 310/155 |
| 5,296,805 A | * | 3/1994 | Clark et al. ............... | 384/448 |
| 5,670,874 A | * | 9/1997 | Miyazaki et al. ......... | 384/448 |
| 5,814,984 A | * | 9/1998 | Ohmi et al. ............... | 384/448 |
| 5,851,074 A | * | 12/1998 | Sakamoto .................. | 384/448 |
| 6,217,220 B1 | | 4/2001 | Ohkuma et al. | |
| 6,218,827 B1 | * | 4/2001 | Ohmi et al. ............... | 384/448 |
| 6,541,958 B2 | * | 4/2003 | Harada ...................... | 384/448 |

FOREIGN PATENT DOCUMENTS

| | | | |
|---|---|---|---|
| DE | 3241212 A1 | * | 5/1983 |
| DE | 3827207 A1 | * | 3/1989 |
| JP | 10-73612 A | | 3/1998 |
| JP | 11-23596 A | | 1/1999 |
| JP | 2000-198304 A | | 7/2000 |
| JP | 2003-13982 A | | 1/2003 |
| JP | 2004-44664 A | | 2/2004 |

(Continued)

*Primary Examiner*—Marcus Charles
(74) *Attorney, Agent, or Firm*—Birch, Stewart, Kolasch & Birch, LLP

(57) ABSTRACT

[Problems] A bearing assembly is provided which is designed to prevent a core (metal annular member), used in a synthetic-resin cover, from disengaging from the cover.

[Means for Solving Problems] A bearing assembly H includes: a synthetic-resin cover 25 fitted in an inside surface of a vehicular-inner-side end of an outer ring member 2, and a metal annular member 33 disposed on an inside surface of a fitting engagement portion 26 of the cover 25, the fitting engagement portion being fitted in the inside surface of the outer ring member 2. The annular member 33 includes an engaging portion 33a in engagement with the cover 25.

5 Claims, 7 Drawing Sheets

FOREIGN PATENT DOCUMENTS

| | | | |
|---|---|---|---|
| JP | 2004-52829 A | | 2/2004 |
| JP | 2004052832 A | * | 2/2004 |
| JP | 2004232866 A | * | 8/2004 |
| JP | 2005-9527 A | | 1/2005 |
| JP | 2005-337318 A | | 12/2005 |
| WO | WO-2004/081401 A1 | | 9/2004 |

* cited by examiner

BEARING ASSEMBLY

TECHNICAL FIELD

The present invention relates to a bearing assembly. More particularly, the invention relates to a bearing assembly wherein a synthetic-resin cover is fit in an inside surface of an outer ring member constituting the bearing assembly.

BACKGROUND ART

Conventionally, a rolling bearing assembly has been widely used for rotatably carrying a wheel under a body of an automotive vehicle. As shown in FIG. 6, such a bearing assembly generally includes: an outer ring member 233 fixed to the vehicle body and possessing double raceway surfaces formed on an inside surface thereof; an inner ring member 235 located radially inwardly of the outer ring member 233 in a coaxial relation therewith and adapted for rotation as possessing double raceway surfaces formed on an outside surface thereof; and two rows of rolling elements 236 rollably interposed between the raceway surfaces of the outer ring member 233 and the inner ring member 235. The inner ring member 235 includes: a hub spindle 237; and an inner-ring component member 238 independent from the hub spindle 237 and fitted on a vehicular-inner-side end of the hub spindle 237. In cases, a cover 245 may be fitted in a vehicular-inner-side end of the outer ring member 233 such as to prevent muddy water and the like from entering a radially inside area of the outer ring member through a vehicular-inner-side opening thereof. A sensor for detecting the number of revolutions of the wheel is normally mounted to the cover in a case where the control of an antilock brake system or a traction control system is provided.

Such a cover 245 has conventionally been formed from a metal material by using a mold. More recently, however, it has become a practice to form the cover 254 from a synthetic-resin material in order to reduce the weight and cost thereof (see, for example, Japanese Unexamined Patent Publication No. 2004-44664).

Because of the material properties, the synthetic-resin cover 245 per se cannot achieve a great fitting or engaging force. Therefore, an arrangement is contemplated wherein a core 247 substantially having a short cylindrical shape is provided on an inside surface of a cover portion, which is fitted in the inside surface of the outer ring member, so that the cover may achieve a predetermined fitting or engaging force based on the rigidity of the core 247 (FIG. 7).

During manufacture of the cover, the core 247 is placed at a predetermined position in a mold so as to be unified with the cover 245. Since the synthetic-resin material forming the cover 245 and the metal forming the core 247 have different linear expansion coefficients, repeated temperature fluctuations may cause the core 247 to disengage from the cover 245 and to project to a vehicular outer side (indicated by a hollow arrow in FIG. 7). If the core 247 disengages from the cover 245, the cover 245 is decreased in the fitting or engaging force so that the cover 245 may be displaced from a predetermined position with respect to the outer ring member 233. What is worse, the cover may disengage from the outer ring member 233. In such cases, the sensor mounted to the cover 245 is displaced so as to be unable to detect the number of revolutions of the wheel correctly. This disables the control of the antilock brake system or the like. Furthermore, the disengaged core 247 may interfere with another component, producing noises or causing damage thereto. If the cover 245 disengages from the outer ring member, the muddy water and the like may enter the radially inside area of the outer ring member 233 and may corrode the components of the bearing assembly.

In view of the foregoing, the invention has an object to provide a bearing assembly adapted to prevent the core used with the synthetic-resin cover from disengaging from the cover.

SUMMARY OF THE INVENTION

A bearing assembly according to the invention comprises a synthetic-resin cover fitted in an inside surface of a vehicular-inner-side end of an outer ring member, and a metal annular member disposed at an inside surface of a fitting engagement portion of the cover, the fitting engagement portion being fitted in the inside surface of the outer ring member, and is characterized in that the annular member includes an engaging portion in engagement with the cover.

The above cover member is not limited to the member totally formed from the resin material but may also include one wherein the fitting engagement portion with the outer ring member is formed from a resin material.

The invention offers the following advantage. In a state where the cover member is fixedly fitted in the end of the outer ring member, the annular member is disposed at the inside surface of the fitting engagement portion of the cover while the engaging portion of the annular member is engaged with the cover member. Therefore, if an excessive difference of thermal expansions or thermal shrinkages results from the different linear expansion coefficients of the cover member formed from the resin material and the annular member formed from the metal material, there is no fear that the annular member may disengage from the cover member. Accordingly, the cover member may be effectively prevented from readily disengaging from the outer ring member even though the fitting engagement portion of the cover member is not increased in the fitting engaging force with respect to the outer ring member or if the fitting engaging force is decreased.

According to another aspect of the invention, the engaging portion may be a projecting portion formed by radially outwardly projecting a part of the annular member. According to still another aspect of the invention, the projecting portion may be a bent portion formed by bending an end (a vehicular-outer-side end or a vehicular-inner-side end) of the annular member in a radially outward direction of the outer ring member. In a case where the engaging portion of the annular member is constituted by the arc-like projecting portion formed by radially outwardly projecting a part of the annular member or constituted by the bent portion (projecting portion) radially outwardly bent and extended linearly, the annular member may be firmly engaged with the cover member and be effectively prevented from disengaging from the cover member. If the bent portion is particularly embedded in the cover member, this bent portion serves as a kind of anchor. Hence, the core is prevented from being displaced in the axial direction of the outer ring member and disengaging from the cover, even if the binding strength between the cover and the core is decreased due to temperature fluctuations. Accordingly, the cover is able to maintain its fitting or engaging force, so that the cover is prevented from being displaced from the outer ring member or disengaging from the outer ring member.

It is preferred that a portion belonging to the fitting engagement portion and making contact with the inside surface of the outer ring member as fitted therein has a vehicular-outermost-side region in the axial direction of the outer ring member substantially aligned with the projecting portion with respect to the axial direction of the outer ring member. In the synthetic-resin cover, the fitting engagement portion with respect to the inside surface of the outer ring member is tapered (the portion (indicated by 115a in FIG. 5) fitted in the inside surface of the outer ring member is expanded radially outwardly) due to thermal shrinkage after molding. However, a distal end portion of the fitting engagement portion, which has a great interference with the outer ring member, is aligned with the projecting portion (bent portion) providing a great fitting engaging force (the positions being aligned in the axial direction of the outer ring member), whereby an even greater fitting engaging force may be imparted to the cover. Thus, the cover is assuredly prevented from disengaging from the inside surface of the outer ring member.

The engaging portion may be an engaging hole radially extended through the annular member. In a case where the engaging portion is constituted by the engaging hole radially extended through the annular member, the resin material may be filled in the engaging hole of the annular member when the annular member is insert-molded in the cover member. Therefore, the annular member may be more firmly bound to the cover member, so as to be effectively prevented from disengaging from the cover member.

DETAILED DESCRIPTION OF THE INVENTION

A bearing assembly according to an embodiment of the invention will hereinbelow be described in details with reference to the accompanying drawings.

Figure 1:
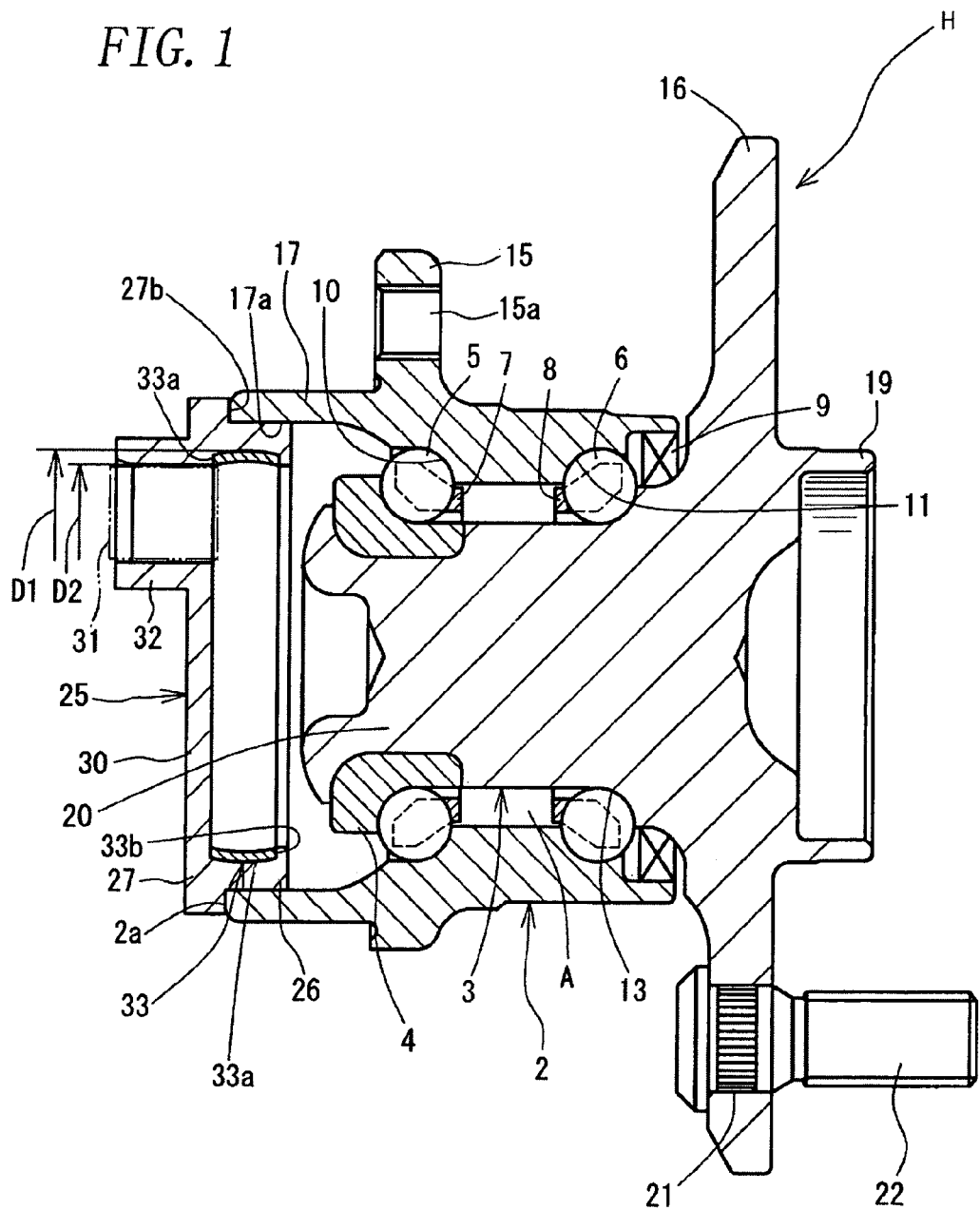
FIG. 1 is a sectional explanatory view of a bearing assembly according to one embodiment of the invention.

FIG. 1 is a longitudinal sectional view showing a wheel rolling bearing assembly H (hereinafter, simply referred to as "bearing assembly") according to one embodiment of the invention. In FIG. 1, the right-hand side represents a vehicular outer side (wheel side) of the bearing assembly H, whereas the left-hand side represents a vehicular inner side (the opposite side to the wheel). The bearing assembly H is constituted as a double-row outward angular contact ball bearing designed to carry an automotive driven wheel. The bearing assembly H includes: an outer ring member 2; a hub spindle 3; an inner ring 4; a plurality of rolling elements 5, 6; two cages 7, 8; and a seal 9. The hub spindle 3 and the inner ring 4 constitute an inner ring member disposed on an inside surface of the outer ring member 2. The outer ring member 2 includes: two raceway surfaces 10, 11 formed in the inside surface thereof; a flange 15 which is radially outwardly extended from an axially intermediate portion of an outer periphery thereof and which is used for fixing the bearing assembly to a vehicle body; and a spigot 17 disposed on the vehicular inner side from the flange 15. The flange 15 is formed with a plurality of bolt holes 15a which are arranged in a circumferential direction thereof and are axially extended therethrough. The spigot 17 is fitted in an inside surface of a knuckle (not shown) assembled to the vehicle body. The flange 15 is fixed to the knuckle with bolts. Thus, the outer ring member 2 is non-rotatably fixed to the knuckle as the vehicle body.

The hub spindle 3 includes: a wheel mounting flange 16 which is extended in the radially outward direction and to which a wheel and a brake disk rotor are mounted; a spigot 19 extended from the flange 16 to the vehicular outer side; a raceway surface 13 formed at place on a vehicular inner side of the flange 16 and opposing the vehicular-outer-side raceway surface 11 of the outer ring member 2; and a small-diameter cylinder portion 20 disposed on a vehicular inner side from the raceway surface 13. The flange 16 of the hub spindle 3 is formed with a plurality of bolt holes 21 which are arranged in a circumferential direction thereof and are axially extended therethrough. Bolts 22 are fixedly fitted in the bolt holes 21 by press insertion. The bolts 22 extend through holes formed in the wheel and the brake disk rotor while nuts are mounted to projecting portions of the bolts, so that the wheel and the brake disk rotor are fixed to the flange 16. The inner ring 4 is fitted on the small-diameter cylinder portion 20 of the hub spindle 3 and is formed with a raceway surface 12 on an outside surface thereof, the raceway surface opposing the vehicular-inner-side raceway surface 10 of the outer ring member 2. The small-diameter cylinder portion 20 has its end radially outwardly roll-caulked to a vehicular-inner-side end of the inner ring 4, whereby a required pre-load is applied to the bearing and the inner ring 4 is integrally combined with the hub spindle 3 as prevented from disengaging from the hub spindle 3. The rolling elements 5, 6 are interposed between the respective raceway surfaces 10, 11 of the outer ring member 2 and the respective raceway surfaces 12, 13 of the inner ring 4 and the hub spindle 3, and are rollably retained by the respective cages 7, 8. The seal 9 is disposed between a vehicular-outer-side end of the outer ring member 2 and the hub spindle 3, thus sealing an annular space A defined between these components from outside and preventing a lubricant such as grease filled in the annular space A from leaking outside.

The bearing assembly H having the above constitution further includes a cover (cover member) 25 for covering an opening of the spigot 17 defining a vehicular-inner-side end of the outer ring member 2. The cover 25 includes: a cylindrical portion 26 fitted in an inside surface 17a of the spigot 17 of the outer ring member 2; an annular portion 27 axially pressed against a vehicular-inner-side end face 2a of the outer ring member 2; and a disk portion 30 for closing the opening of the spigot 17. The disk portion 30 of the cover 25 is formed with a cylindrical portion 32 which is open at both ends thereof and to which a rotation detector 31 schematically shown in the figure is mounted. The cylindrical portion 26 of the cover 25 constitutes a fitting engagement portion for fitting engagement with an inside surface of the end of the outer ring member 2. The cylindrical portion 26 is provided with a metal annular member (core) 33 on an inside surface thereof. The cylindrical portion 26 of the cover 25 is injection molded to the annular member 33 so as to be integrally formed therewith, and has a diameter slightly greater than an inside diameter of the spigot 17.

A part of the annular member 33 is radially outwardly projected in a semicircular arc-shape. The semicircular arc-shaped projecting portion (engaging portion) 33a is so formed as to have an outside diameter D1 greater than an inside diameter D2 of the cylindrical portion 26 of the cover 25. This constitution axially locks a vehicular-inner-side end face 33a and a vehicular-outer-side end face 33b of the annular member 33 to the cylindrical portion 26. A preferred material of the annular member 33 is a cold-rolled sheet steel such as one equivalent to JIS-SPCC. A preferred material of the cover 25 is a synthetic resin material having a linear expansion coefficient approximating that of a material of the outer ring member 2. Examples of a suitable synthetic resin material include polyamide (PA) polyphenylene sulfide (PPS), polybutylene terephthalate (PBT) and the like.

In the bearing assembly H having the above constitution, the hub spindle 3 is rotated about its axis via the balls 5, 6 in conjunction with the rotation of the wheel. The hub spindle 3 is rotated relative to the outer ring member 2 non-rotatably supported by the vehicle body. A number of revolutions of the hub spindle 3 is detected by means of the rotation detector 31. An antilock brake system or a traction control system may be controlled based on the detection result. The cover 25 is used as a dual-purpose member having a function to support the rotation detector 31 and a function to cover the opening of the spigot 17 of the outer ring member 2. Such a cover 25 may be assembled to the spigot 17 as follows. First, the cover 25 is axially pressed into the spigot 17. In this case, the elasticity of the cylindrical portion 26 of the cover 25 permits the cover 25 to be fitted in the inside surface 17a of the spigot 17 although the cylindrical portion 26 of the cover 25 has a slightly greater outside diameter than the inside diameter of the spigot 17. The cover 25 is axially pressed in further, whereby a vehicular-outer-side end face 27b of the annular portion 27 is axially pressed against the vehicular-inner-side end face 2a of the outer ring member 2. Since the cylindrical portion 26 of the cover 25 is designed to have the outside diameter slightly greater than the inside diameter of the spigot 17, the cylindrical portion 26 is inserted as slightly flexed because of its elasticity. However, the elastic deformation of the cylindrical portion 26 is partly supported by way of the rigidity of the annular member 33, which is secured to the inside surface of the cylindrical portion 26.

The bearing assembly H is assembled to the vehicle body according to a procedure wherein the cover member 25 is assembled to the spigot 17 and thereafter, the spigot 17 is assembled to the knuckle of the vehicle body. When the bearing assembly so assembled is used in the aforementioned manner, the outer ring member 2 is raised in temperature and the heat of the outer ring member is transferred to the cylindrical portion 26 of the cover member 25. When the vehicle is halted, on the other hand, the outer ring member 2 is lowered in temperature. In the wheel rolling bearing assembly H, the fluctuated temperatures thereof are transferred to the cover member 25 in this manner. It is noted here that the synthetic resin material has a relatively great linear expansion coefficient. Hence, if the cylindrical portion 26 of the cover 25 is formed only from the aforementioned synthetic resin material, the cylindrical portion may not be able to adapt itself to temperature fluctuations, so that the cover 25 is liable to loss of a predetermined engaging force. Therefore, the annular member 33 having a small expansion coefficient is disposed on the inside surface of the cylindrical portion 26 of the cover 25 such that the cover may be able to maintain the predetermined engaging force in spite of the temperature fluctuations.

Furthermore, a part of the annular member 33 defines the arc-shaped projecting portion 33a which has the outside diameter D1 greater than the inside diameter D2 of the cylindrical portion 26 of the cover member 25, so that the annular member 33 is locked to the cylindrical portion 26 of the cover member 25 in the axial direction. Even if the temperature is repeatedly fluctuated, this constitution may provide an effective prevention of a situation where the annular member 33 is axially disengaged from the cover member 25. Thus, the cover member 25 is able to maintain the predetermined engaging force over an extended period of time.

Figure 2:
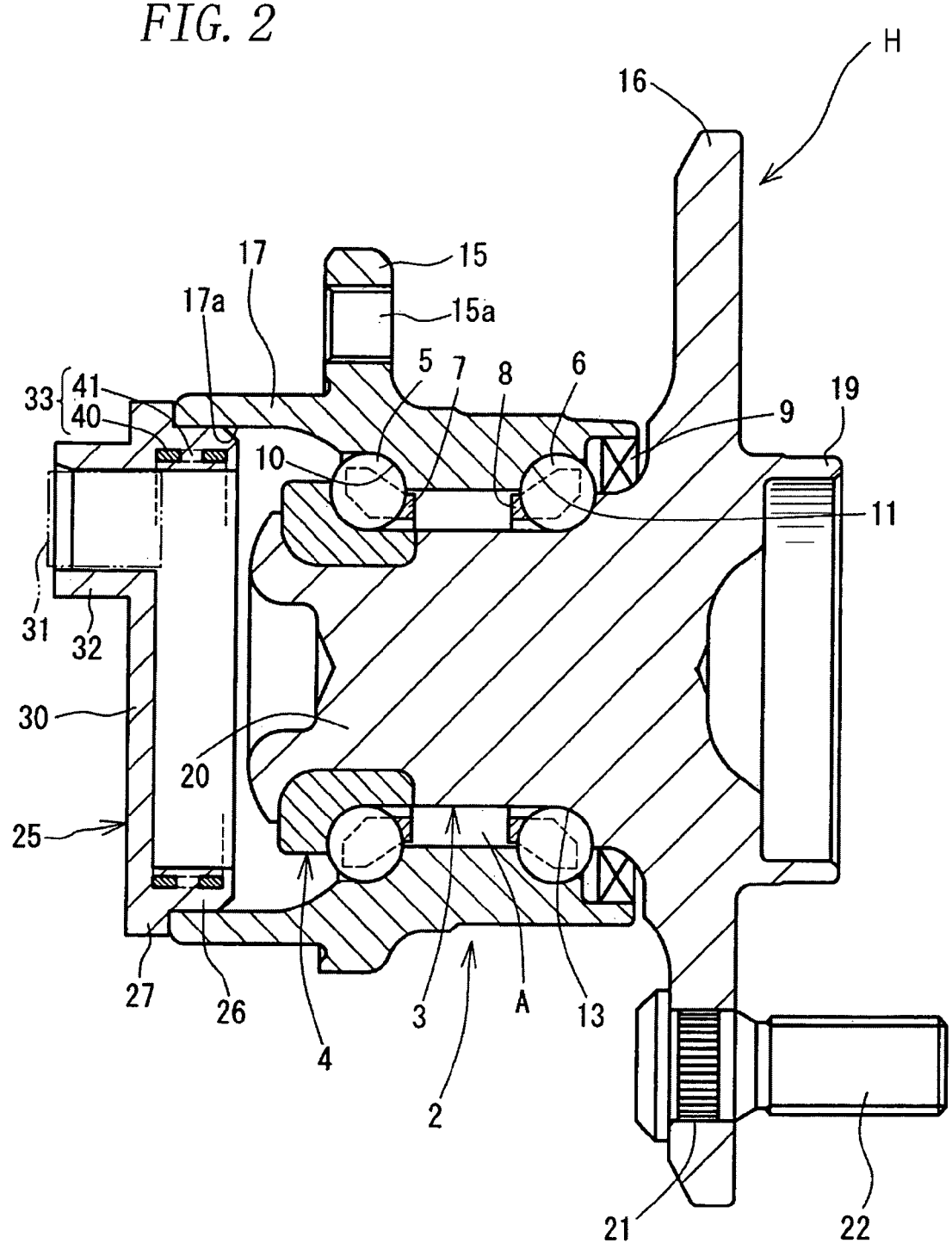
FIG. 2 is a sectional explanatory view of a bearing assembly according to another embodiment of the invention.
Figure 3:
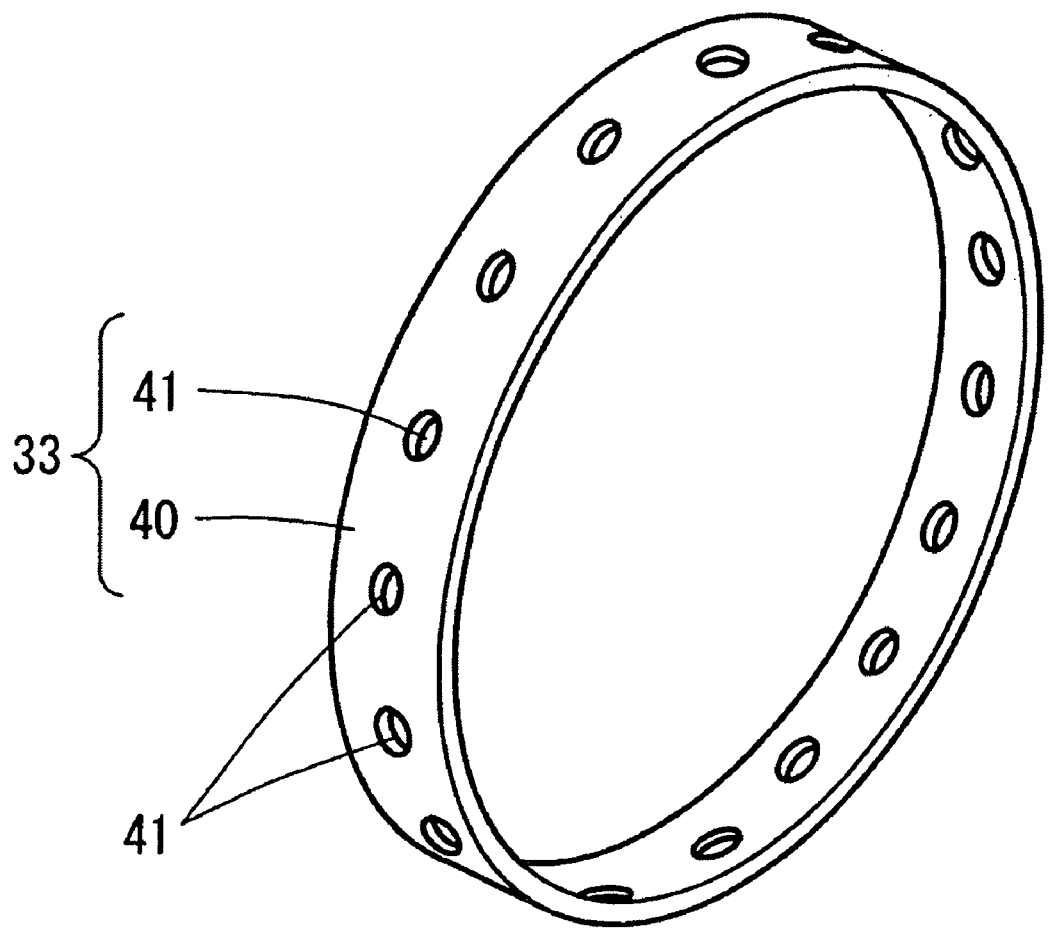
FIG. 3 is an enlarged perspective view showing an annular member shown in FIG. 2.

There may be contemplated many other configurations of the annular member 33 and many other means for unifying the annular member with the cylindrical portion 26 of the cover 25. A specific example shown in FIG. 2 and FIG. 3 is described. In these figures, the annular member 33 of the bearing assembly H has a configuration wherein an annular body 40 of a simple structure is circumferentially formed with a plurality of through-holes (engaging portions) 41 at places intermediate the annular body. The annular member 33 of such a configuration is embedded in the cylindrical portion 26 of the cover 25 so that a synthetic resin material is also filled in the through-holes 41 to unify the annular member 33 with the cylindrical portion 26. Thus, the annular member 33 is fixed to place in a manner to be unmovable in the axial direction. Particularly, the annular member 33 has its vehicular-inner-side end face 33a and vehicular-outer-side end face 33b axially locked to the cylindrical portion 26 of the cover member 25, whereby the annular member 33 is assuredly prevented from axially falling off from the cylindrical portion 26. The other parts are constituted the same way as those of the embodiment shown in FIG. 1 and hence, are represented by the same reference characters, the description of which being dispensed with.

Figure 4:
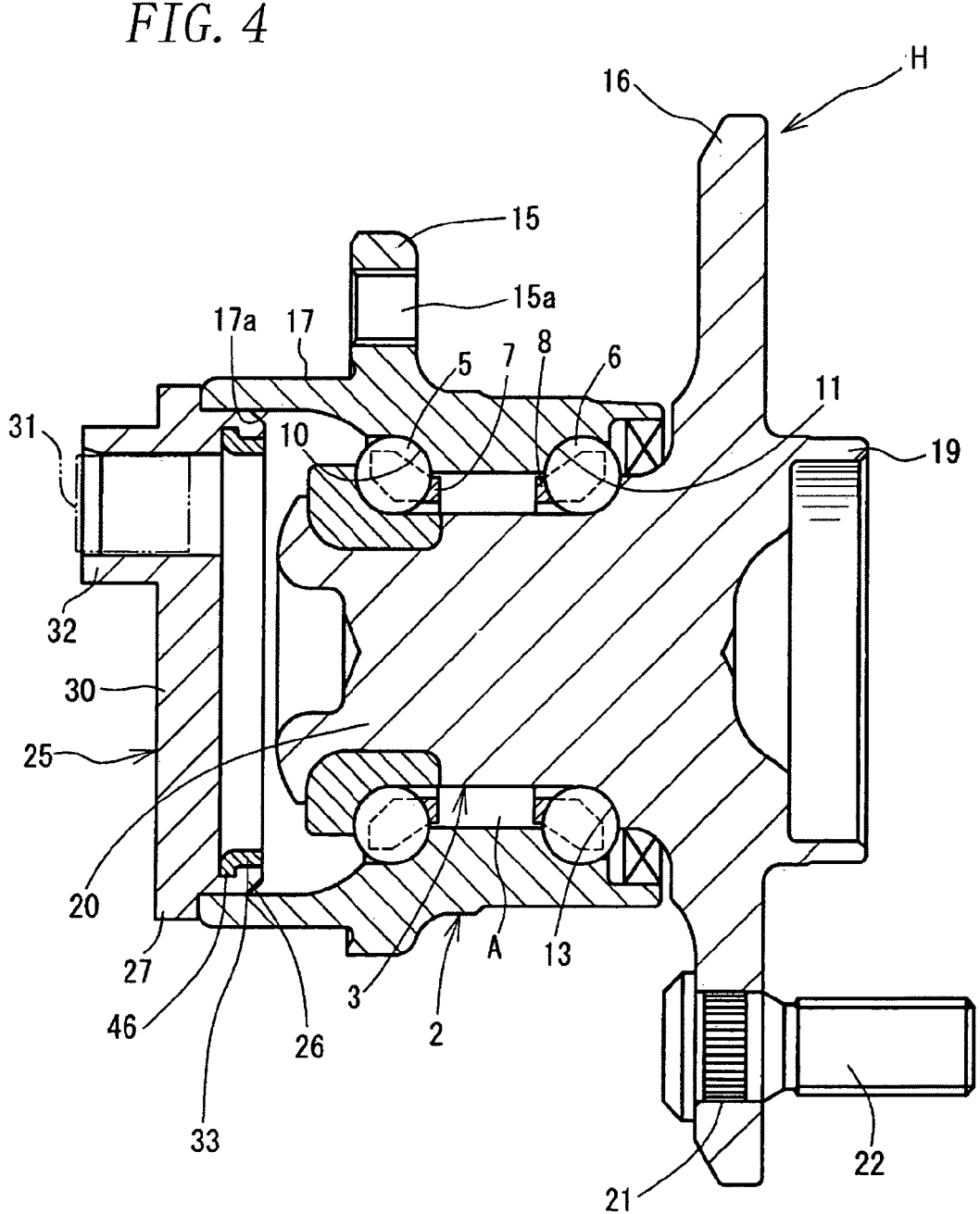
FIG. 4 is a sectional explanatory view of a bearing assembly according to still another embodiment of the invention.

FIG. 4 illustrates another modification of the annular member 33. The annular member 33 includes a bent portion (projecting portion) 46 which is formed by radially outwardly bending the vehicular-inner-side end thereof. The annular member has its bent portion 46 embedded in the cylindrical portion 26 of the cover 25. A vehicular-inner-side end face 46a and a vehicular-outer-side end face 46b of the bent portion 46 of the annular member 33 are axially locked to the cylindrical portion 26 of the cover 25, whereby the annular member 33 is assuredly prevented from axially falling off from the cylindrical portion 26. The other parts are constituted the same way as those of the embodiment shown in FIG. 1 and hence, are represented by the same reference characters, the description of which being dispensed with.

Figure 5:
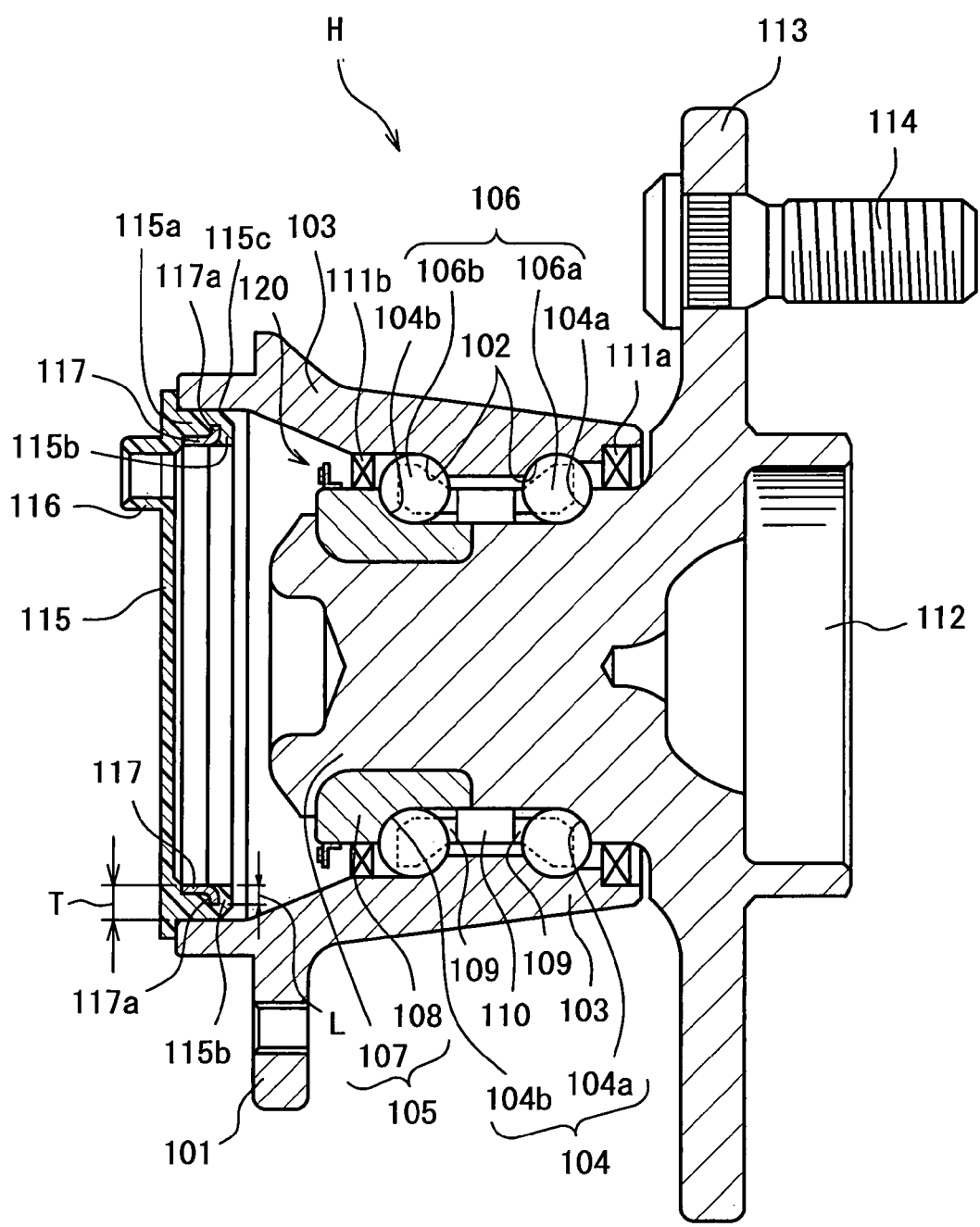
FIG. 5 is a sectional explanatory view of a bearing assembly according to yet another embodiment of the invention.
Figure 6:
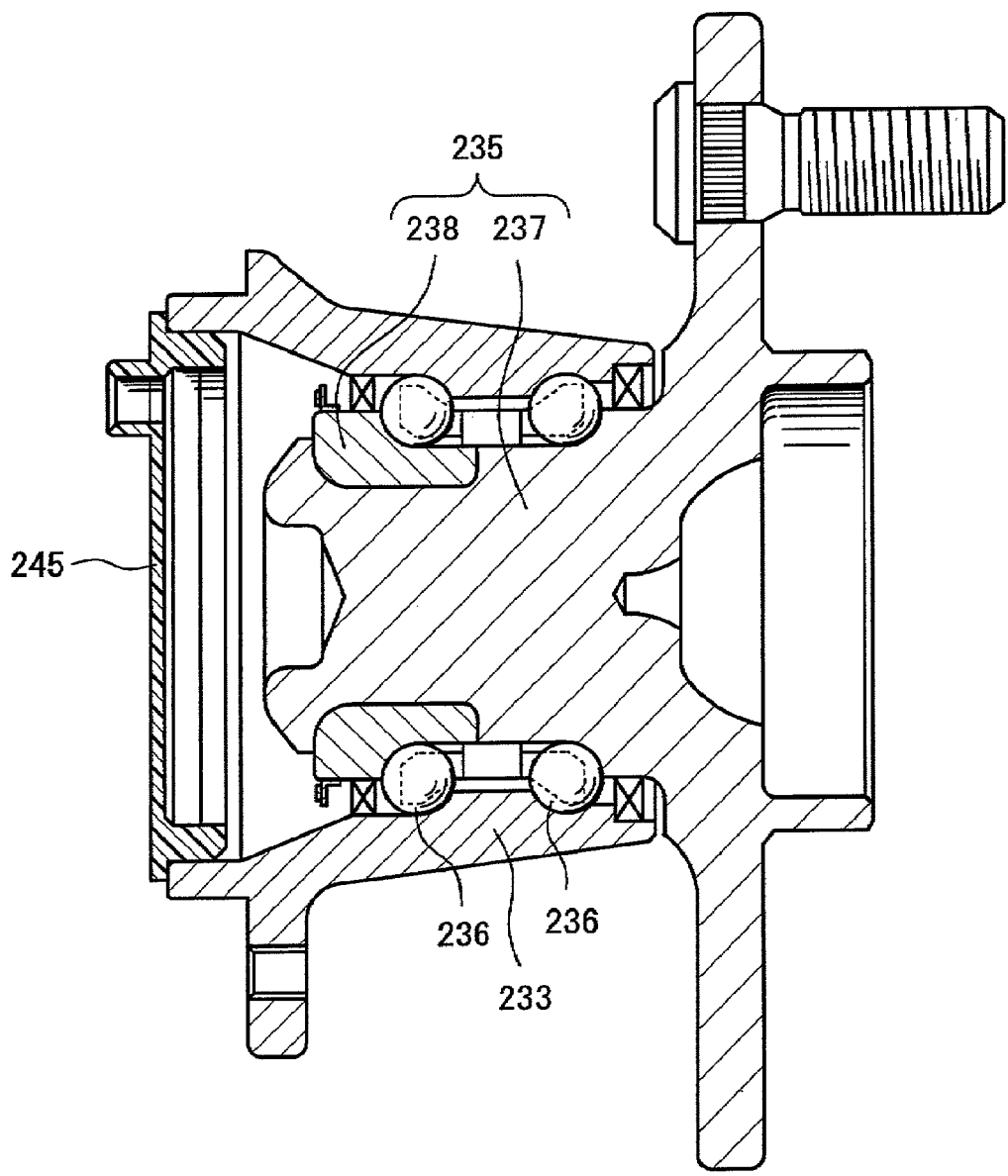
FIG. 6 is a sectional explanatory view of a conventional bearing assembly.
Figure 7:
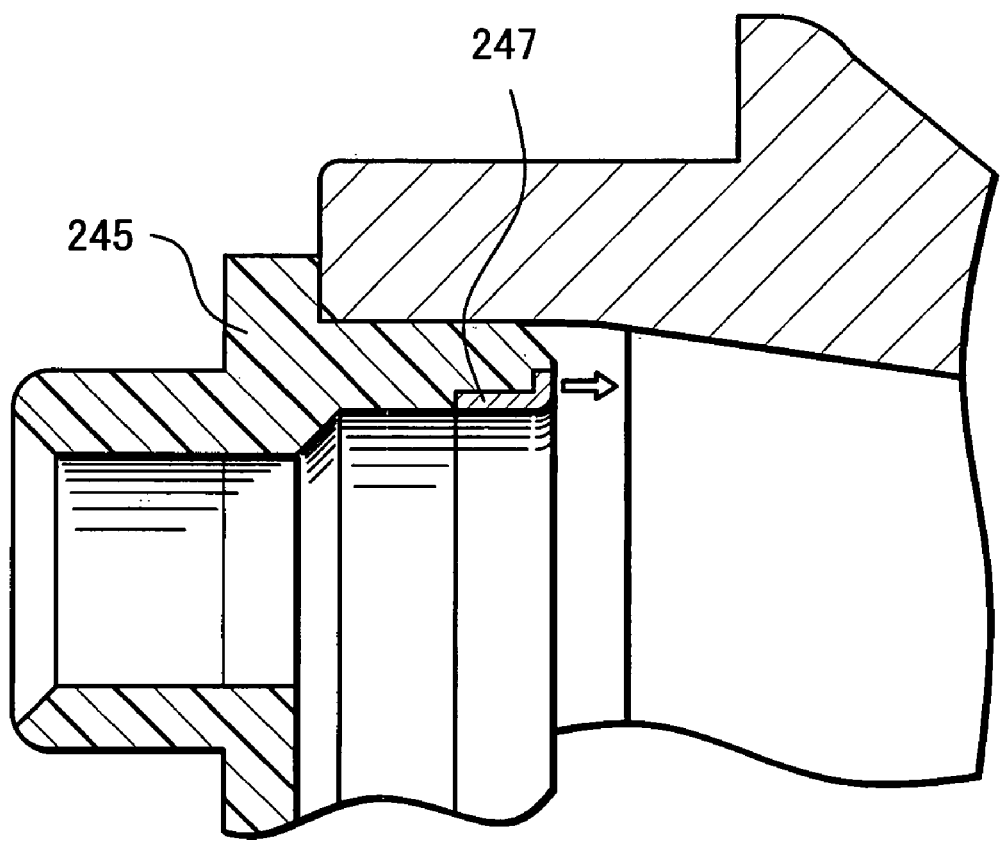
FIG. 7 is fragmentary sectional explanatory view of a bearing assembly having a core disposed at an inside surface of a cover.

FIG. 5 illustrates a bearing assembly H according to another embodiment of the invention. This bearing assembly H is a wheel bearing assembly mounted to the driven wheel of the vehicle. The bearing assembly H includes: an outer ring member 103 fixed to the vehicle by means of a mounting flange 101 for mounting the bearing assembly to the vehicle body and possessing a double-row outer raceway surfaces 102 formed on an inside surface thereof; an inner ring member 105 disposed radially inwardly of the outer ring member 103 in a coaxial relation therewith and possessing a double-row inner raceway surfaces 104 formed on an outside surface thereof; and two rows of balls 106 as rolling elements rollably interposed between the respective raceway surfaces 102, 104 of the outer ring member 103 and inner ring member 105. The inner ring member 105 includes: a hub spindle 107; and an inner-ring component member 108 independent from the hub spindle 107 and fitted on an outside diameter of a vehicular-inner-side end of the hub spindle 107. The hub spindle 107 is rotatably carried in the outer ring member 103 by way of the two rows of balls 106.

Out of the two rows of balls 106, one row of balls 106a are arranged on an inner raceway surface 104a formed on a vehicular-outer-side outside surface of the hub spindle 107, whereas the other row of balls 106b are arranged on an inner raceway surface 104b formed on an outside surface of the inner-ring component member 108. The balls of the individual rows 106a, 106b are retained by a cage 109 at equal space intervals in the circumferential direction. Seal portions 111a, 111b are interposed between the inside surface of the outer ring member 103 and the outside surface of the inner ring member 105 consisting of the hub spindle 107 and the inner-ring component member 108, so as to seal a bearing space 110 between the outer and inner ring members on the vehicular outer side and the vehicular inner side.

A mounting recess 112 mounted to the wheel is formed at a vehicular-outer-side end face of the hub spindle 107. A hub flange 113 is radially outwardly extended from place on the vehicular outer side of the outside surface of the hub spindle 107. A brake disk rotor and the wheel (not shown) are mounted to the hub flange 114 by means of hub bolts 114 press-inserted through the hub flange 113.

A cover (cover member) 115 is fitted in an inside surface of a vehicular-inner-side end of the outer ring member 103. The cover 115 is formed with a sensor mounting portion 116 for mounting a sensor (not shown) for detecting the rotational speed of the wheel. A pulser ring 120 is disposed on an outside surface of a vehicular-inner-side end of the inner-ring component member 108 so as to be rotated along with the inner-ring component member. The above sensor detects a magnetic member of the pulser ring 120 thereby detecting the rotational speed of the wheel.

In the cover 115, a portion (fitting engagement portion) 115a fitted in the inside surface of the outer ring member 103 is provided with a metal annular member 117 on an inside surface thereof. The annular member 117 is used for increasing a fitting engaging force of the cover 115. Namely, the annular member is used for increasing an anti-fall strength of the cover 115 such that the cover fitted in the inside surface of the outer ring member 103 may be prevented from disengaging from the outer ring member 103. According to the bearing assembly of the embodiment, a vehicular-outer-side end of such an annular member 117 is bent to project in the radially outward direction of the outer ring member 117. What is more, a bent portion 117a defined by the projecting portion is embedded in the cover 115. The bent portion 117a may be formed by, for example, press working one end of a short metal cylinder body constituting the annular member 117. While a radial dimension L of the bent portion 117a is not particularly limited, a good rule of thumb is to define the radial dimension L to be on the order of 50 to 60% of the thickness T of the cover portion 115a fitted in the inside surface of the outer ring member 103. If the dimension L is too great, the bent portion 117a lowers the fluidity of a molten synthetic resin cast into a mold in which the annular member 117 is placed. This leads to a drawback that a sufficient quantity of synthetic resin is not charged in a distal end 115b of the cover 115. If the dimension L is too small, on the other hand, the annular member 117 has such a poor anti-fall strength as to fail to prevent itself from disengaging from the cover 115.

In the synthetic-resin cover 115, the fitting engagement portion 115a to be fitted in the inside surface of the outer ring member is tapered (the portion (115a fitted in the inside surface of the outer ring member 103 is expanded radially outwardly) due to thermal shrinkage after molding. It is therefore preferred to position the annular member 117 in a manner to align an edge portion 115c of an outside surface of the fitting engagement portion 115a (the outside surface making contact with the inside surface of the outer ring member 103) with the bent portion 117a of the annular member 117. The edge portion of the fitting engagement portion has a great interference with the outer ring member 103, whereas the bent portion of the annular member provides a great fitting engaging force. Such an arrangement may impart an even greater fitting engaging force to the cover 115, thereby assuredly preventing the cover 115 from disengaging from the inside surface of the outer ring member 103.

The invention claimed is:

1. A bearing assembly comprising:
   a synthetic-resin cover fitted in an inside surface of a vehicular-inner-side end of an outer ring member; and
   a metal annular member disposed at an inside surface of a fitting engagement portion of the cover, the fitting engagement portion being fitted in the inside surface of the outer ring member,
   wherein the annular member includes an engaging portion in engagement with the cover, the engagement portion being concave with respect to the inside surface of the fitting engagement portion of the cover.

2. A bearing assembly claim 1, comprising:
   a synthetic-resin cover fitted in an inside surface of a vehicular-inner-side end of an outer ring member, the outer ring member defining a central axis; and
   a metal annular member disposed at an inside surface of a fitting engagement portion of the cover, the fitting engagement portion having a free end fitted in the inside surface of the outer ring member,
   wherein the annular member includes an engaging portion in engagement with the cover, the engaging portion is a projecting portion formed by radially outwardly projecting a part of the annular member substantially perpendicular to the central axis, and
   the projecting portion being spaced from the free end of the fitting engagement member.

3. The bearing assembly according to claim 2, wherein the projecting portion is a bent portion formed by bending an end of the annular member in a radially outward direction of the outer ring member.

4. The bearing assembly according to claim 2, wherein a portion belonging to the fitting engagement portion and making contact with the inside surface of the outer ring member as fitted therein has a vehicular-outermost-side region in an axial direction of the outer ring member substantially aligned with the projecting portion with respect to the axial direction of the outer ring member.

5. The bearing assembly according to claim 2, wherein the annular member has an end opposite the projection portion located between the projection portion and the free end of the fitting engagement member.

* * * * *